(12) United States Patent
Kim

(10) Patent No.: US 7,701,348 B2
(45) Date of Patent: Apr. 20, 2010

(54) EMBEDDED SYSTEM ARCHITECTURE FOR RFID TAG EMULATION

(75) Inventor: Sooyeon Kim, Seoul (KR)

(73) Assignees: International Business Machines Corporation, Armonk, NY (US); Institute for Information Technology Advancement (KR)

( * ) Notice: Subject to any disclaimer, the term of this patent is extended or adjusted under 35 U.S.C. 154(b) by 264 days.

(21) Appl. No.: 12/016,705

(22) Filed: Jan. 18, 2008

(65) Prior Publication Data

US 2009/0184826 A1    Jul. 23, 2009

(51) Int. Cl.
G08B 13/14    (2006.01)
(52) U.S. Cl. .................................................. 340/572.4
(58) Field of Classification Search ............... 340/572.4, 340/572.1, 572.7, 10.1; 235/462.22
See application file for complete search history.

(56) References Cited

U.S. PATENT DOCUMENTS 7,407,110 B2 *   8/2008   Davis et al. ............. 235/472.02

2008/0001746 A1 *   1/2008   Childress et al. ......... 340/572.1
2008/0018433 A1 *   1/2008   Pitt-Pladdy ................ 340/10.4

* cited by examiner

*Primary Examiner*—Phung Nguyen
(74) *Attorney, Agent, or Firm*—Scully, Scott, Murphy & Presser, P.C.; Kenneth Corsello, Esq.

(57) ABSTRACT

An apparatus for emulating multiple RFID tags in a supply chain/logistics network, comprising: an RFID transceiver for receiving an RF command from an interrogator, a controller for converting the received RF command into a digitized message, an RFID emulation unit for retrieving or storing identification data with respect to the multiple differing RFID tags, wherein the RFID emulation unit retrieves or stores identification data in one or more ID repositories with respect to one or more product RFID tags, one or more case RFID tags and a pallet RFID tag and the controller responding to the interrogator with a single ID retrieved from the one or more ID repositories contain information as to the one or more product RFID tags, one or more case RFID tags and a pallet RFID tag, wherein the RFID emulation unit retrieves or stores the identification data on a remote server over the Internet or locally in non-volatile memory of each apparatus. In addition, the apparatus can contain a housing, a handle and a display screen and an input device to allow a user at any point in the supply chain/logistic network to quickly determine information on the products, cases or pallet.

8 Claims, 3 Drawing Sheets

EMBEDDED SYSTEM ARCHITECTURE FOR RFID TAG EMULATION

BACKGROUND OF THE INVENTION

1. Field of the Invention

The present invention generally relates to RFID tags, more particularly, an apparatus, system, method and computer program storage device for emulating multiple RFID tags in a supply chain/logistics network to create a single interrogator read point.

2. Description of the Prior Art

Increasingly, radio frequency identification (RFID) solutions are being deployed resulting in RFID tags attached to or embedded in all sorts of objects. The main thrust behind this increased deployment of RFID solutions is the electronic product code (EPC) system, which is a family of coding schemes employing RFID technology as an eventual successor to the bar code. More recently, EPC networks have been proposed such as EPCglobal® which is a collection of inter-related RFID standards for hardware, software, and data interfaces networked together with a core service provider to enhance a supply chain to a community of trading partners engaged in the capture, sharing, and discovery of EPC related data.

In operation, an EPC network such as EPCglobal® share information among RFID devices and service providers (e.g. identifying the object and its location) after an RFID reader/interrogator interrogates and identifies an RFID tag. A very limited amount of information is encoded in the RFID tag and different vendors will assign and issue different tags which typically leads to multiple tags on a single object. Accordingly, RFID tags traveling along a supply chain will encountering numerous RFID tag readers/interrogators (read points) throughout their lifetimes.

Referring to FIG. 1A, a conventional interrogator 110 is illustrated interacting with several similar RFID tags attached or embedded in various objects 100. As can be seen in FIG. 1A, an RFID reader (hereafter "interrogator") 110 is capable of interrogating various objects such as electronic devices having RFID tags 120, coupled to or embedded within the electronic device, such as an mp3 player 130, a laptop computer 140, a PDA 150 and a cellular phone 160. In operation, the interrogator 110 sends an interrogation signal to the RFID tags 120 and receives back a response signal including an ID based upon hard coded information in the RFID tag 120. The interrogator 110 compares the ID to entries in a database (not shown) for identifying the ID tag 120 to a specific object (as well as other information such as location and ultimate destination).

RFID tags 120, as mentioned above are commonly utilized in supply chain networks, for example coupled to or embedded in objects such as a box (not shown) or within the box, a case (not shown) or an entire pallet 170 which may contain multiple boxes. FIG. 1B illustrates a conventional supply chain network where multiple differing types of RFID tags are attached to an object. As can be seen in FIG. 1B, a bottle of wine 172 has a product RFID tag 122 attached at the wine manufacture's site. Product RFID tag 122 is a high frequency (HF) tag (13.56 MHZ, ISO 18000-3), which is attached to every wine bottle 172. The manufacture can also attach a case RFID tag 124 to a case of wine 174. For example, as shown in FIG. 1B, a wine case 174 is cased by six bottles per case and tagged with case RFID tag 124, which is an ultra high frequency (UHF) (900 MHZ, ISO 18000-6B) tag. Moreover, shippers and wholesalers and other intermediates in the supply chain might attach other types of RFID tags to the wine case 174. Later, in the supply chain, wine cases 176 are stacked 27 cases per pallet 170. Each pallet 170 is tagged with a pallet tag 126, such as a UHF (900 MHZ, ISO 18000-6B) RFID tag manufactured by Intermec® (Large Ridged Tag GEN-2-ITO4UOOYTT001A). Each RFID tag described above, the pallet RFID tag 126, the case RFID tag 124, and the product RFID tag 122 may likely only communication with a specific interrogator 110. Hence, at each point of contact in a supply chain network, multiple interrogators 110 would be required in order to have full information on the products on a pallet 170.

In the conventional supply chain network, as shown in the example of FIG. 1E, a single pallet 170 can contain multiple, i.e. hundreds of differing RFID tags. The conventional pallet 170 contains a pallet tag 126 affixed to the pallet itself, twenty-seven cases 176, each contain a case RFID tag 124 (or more depending on whether a shipper or wholesaler added additional RFID tags), and nested within each case 174, are six product RFID tags 122 (27+27*6+1=190 RFID tags). The shear number of differing RFID tags can potentially cause each interrogator 110 to misread a product RFID tag 122, case RFID tag 124 or pallet RFID tag 126 due to RF interference among the differing RFID tags. Also RFID in the conventional supply chain RFID tags likely become damaged due to the harsh conditions of shipping/warehousing, which also cause misreads by the interrogator 110. Therefore, it would be highly desirable to avoiding having to affix more than one RFID tags to an object. Alternatively, it would be highly desirable to avoid having multiple interrogators at each point of access (read point) in a supply chain network.

Having set forth the limitations of the prior art, it is clear that what is required is a method, system or computer program storage device capable of emulating RFID tags for device identification without the necessity of affixing multiple physical RFID tags to devices or reading each individual RFID tag, i.e., for products on a pallet container, or like transport means through a network.

SUMMARY OF THE INVENTION

It is therefore an object of the present invention to provide an apparatus for emulating multiple RFID tags in a supply chain/logistics network for creating a single interrogator read point and method, system and computer program storage device for doing the same.

In one embodiment of the present invention, RFID tags are emulated in RFID aware devices, where such devices are equipped with a processor, memory, an Internet/intranet network access interface and a transceiver capable of receiving RF signals. The method comprises, transmitting an RF command, by an RFID interrogator device to at least one or more RFID aware devices, the at least one or more RFID aware devices including an RFID transceiver for receiving the transmitted RF command, converting the received RE command, by a controller, into a digitized message, and transmitting the digitized message to an RFID emulation unit for retrieving and/or storing identification data, wherein the RFID emulation unit retrieves or stores identification data in an ID repository; and responding to the interrogator with an ID based upon the retrieved identification data stored in the ID repository.

In another embodiment of the present invention, the RFID emulation unit retrieves or stores said identification data on a remote server over the Internet or locally in non-volatile memory provided in each of the RFID aware devices.

In yet another embodiment of the present invention, the method further includes the step of subscribing to an electronic product code (EPC) network provider for retrieving and storing IDs.

In yet still another embodiment of the present invention, an inference engine determines context information relevant to the interrogator.

The apparatus can also be provided with a display screen and an input device to allow a user at any point in the supply chain/logistic network to quickly determine information on the products, cases or pallet. In addition, a housing can be provided for housing the apparatus and a handle for allowing the apparatus to be placed or buried in a pallet.

In yet still another embodiment of one or more interrogators can be installed in the apparatus for obtaining IDs with respect to each product RFID tag, each case RFID tag and pallet RFID tag, or other RFID tag types and adding them to the ID repository.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Hereinafter, embodiments of the present invention will be described in detail with reference to the accompanying drawings.

Figure 2:
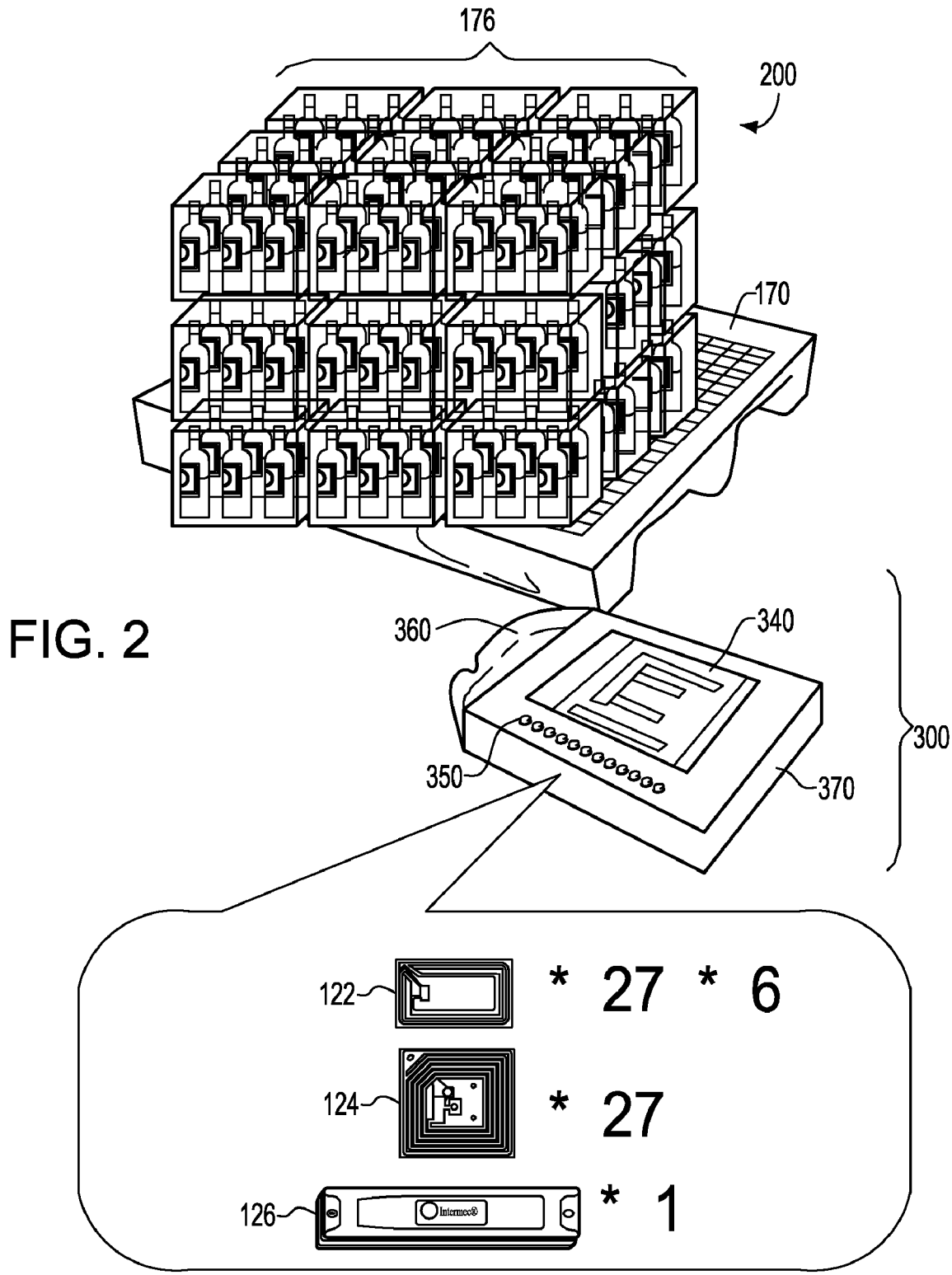
FIG. 2 is an illustration of an apparatus for emulating multiple RFID tags in a supply chain/logistics network for creating a single interrogator read point and a method, system and computer readable storage device for doing the same according to one embodiment of the invention.

FIG. 2 illustrates an RFID aware device 300 for emulating multiple RFID tags in a supply chain/logistics network 200 for creating a single interrogator read point and a method, system and computer readable storage device for doing the same in accordance with one embodiment of the present invention. As can be seen in FIG. 2, an RFID aware device 300 can be placed or buried in a pallet 170 or like conveyance device containing one or more product packages (e.g., cases) 176 and can travel with the pallet or container 170 throughout its entire journey through the supply chain/logistic network. RFID aware device 300, as explained in more detail below, provides one or more ID repositories with data contained on product, case and RFID tags. This data is provided to RFID aware device 300 by means of directly inputting the information into the RFID aware device by communication means such as docking with a wired or wireless local area network, inputting the data directly into RFID aware device 300 or by inserting a memory stick or other memory storage device into RFID aware device 300. Alternatively, RFID aware device 300 can scan all the products, case and pallet tags by way of an internal interrogator included in the device.

Figure 3:
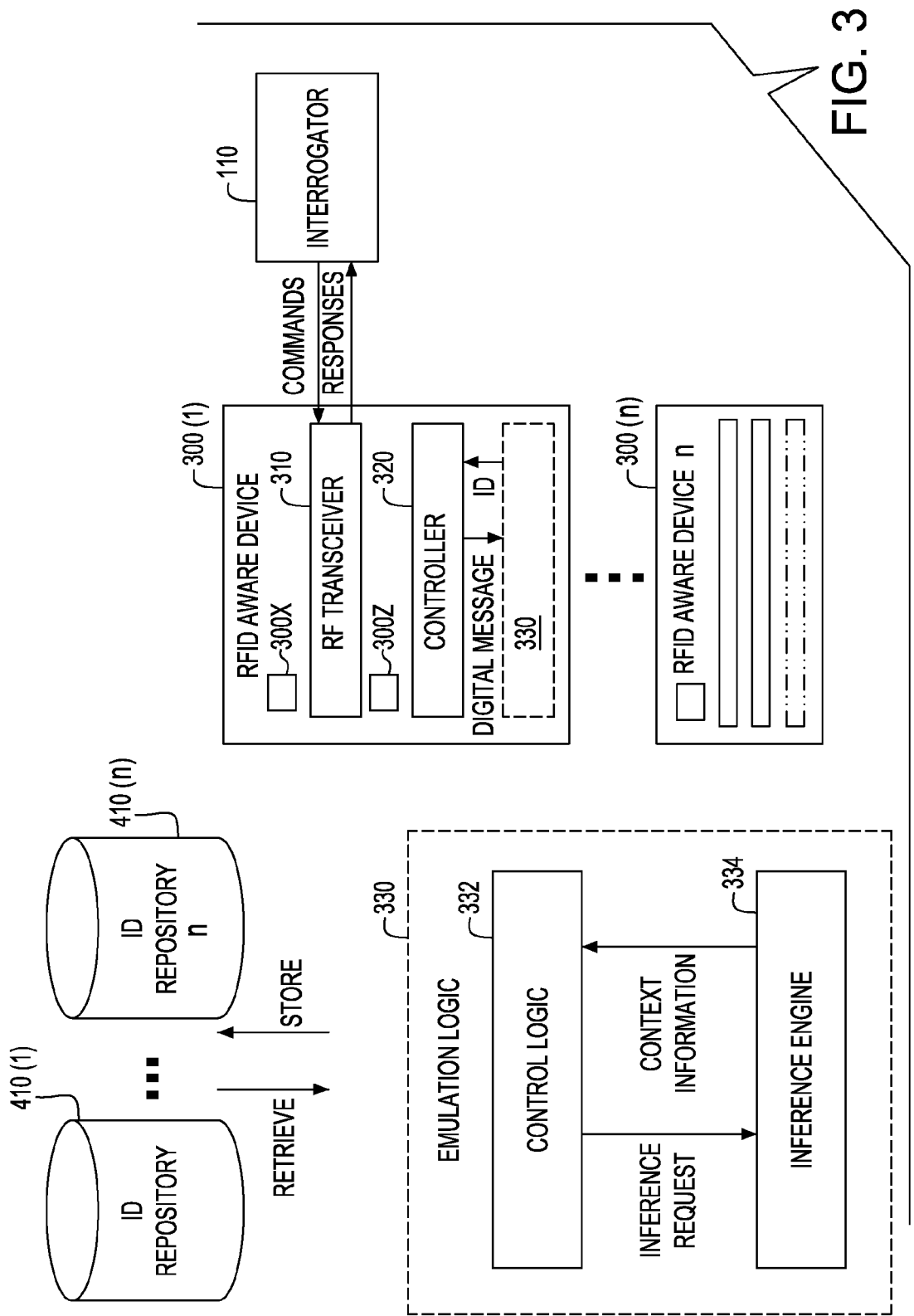
FIG. 3 is an illustration of an example of an apparatus for emulating multiple RFID tags contained on single pallet in a supply chain/logistics network to provide a single read point according to one embodiment of the present invention.

Referring to FIG. 3, an RFID aware device 300 contains a controller 320, memory 300Z, an Internet/intranet network access interface 300X and a transceiver capable of receiving RF signals 310 such as an air interface like the ISO/IEC 18000. As known to those skilled in the art, ISO/IEC 18000 is a global standard that describes the physical interactions between various types of interrogators and RFID tags, by defining the protocols commands, and collision arbitration schemes among various RFID devices manufactured by various vendors.

Figure 1A:
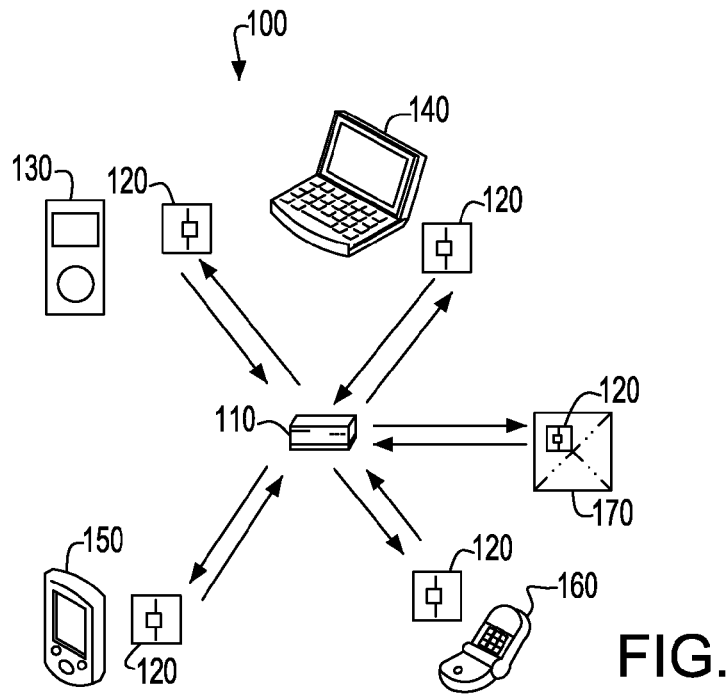
FIG. 1A is an illustration of a conventional interrogator interacting with several RFID tags attached to various objects.
Figure 1B:
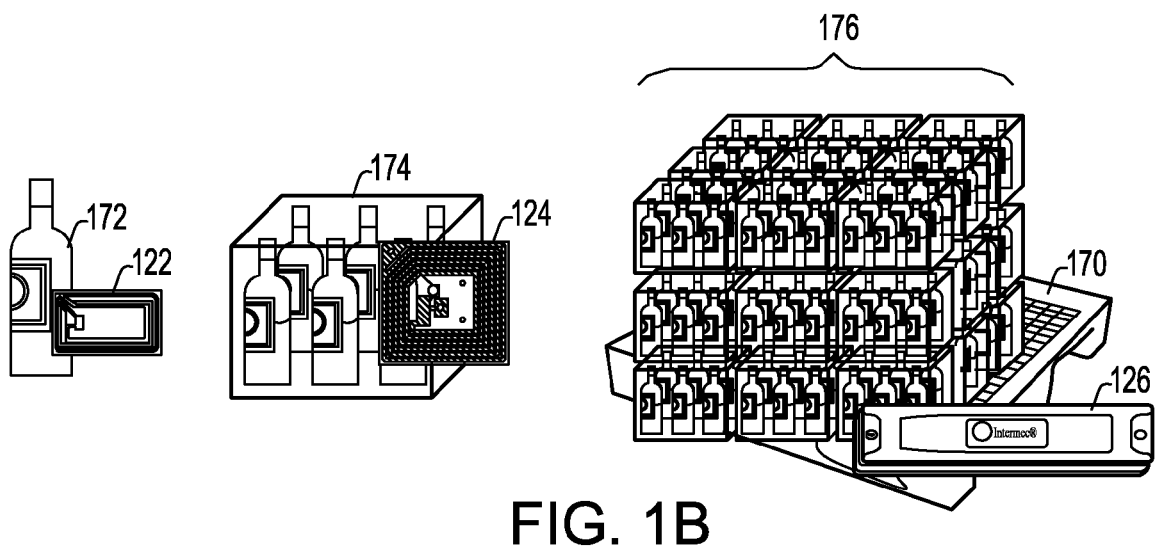
FIG. 1B is an illustration of an example of a conventional supply chain operation.

In a supply chain network, at various RFID interrogation points, the present invention's RFID aware devices 300(1)-300(n) receive command signal from various differing types of RFID interrogators 110 which triggers the one or more RFID aware devices 300(1) and 300(n) within the interrogator 110 field of view. In response to the command signal, RFID aware devices 300(1)-300(n), as further detailed below, return a single response signal containing ID information with respect to each product RFID tag 122, each case or product package RFID tag 124 and the pallet or conveyance container RFID tag 126 associated with the products at the interrogator location as shown in FIG. 1B.

Referring again to FIG. 3, the RFID aware device 300 is programmed with an embedded emulation logic unit 330 within a data structure (e.g., database table) persisted in a non-volatile storage memory (not shown) of the RFID aware device 300 as denoted by the dashed line 330 in FIG. 3. Alternatively, the embedded emulation logic 330 can be formed within FPGA or DSP circuitry of an RFID aware device 300 as known to those skilled in the art.

In operation, the embedded emulation logic unit 330 collects information pertaining to each product RFID tag 122, each case or product package RFID tag 124 and pallet RFID tag 126 and collate the information into a single response signal. In other words, one or more ID repositories 410(1) and 410(n) configured for receiving and maintaining the RFID data (e.g., a list of IDs associated with the RFID aware device and/or the object (e.g., pallet or container device with multiple cases/packages of product items), emulated types of tags (e.g., air interface like ISO/IEC 18000-6A), categories of IDs (e.g., pallet ID, case ID, item ID), and the authority who granted each ID). The major functions of the repository are two fold: 1) adding a new ID to the repository upon the request from an interrogator, which mimics RFID write to a physical tag; and, 2) delivering an ID to the control logic in response to a retrieval request from the control logic, which also imitates generic RFID tag behavior. ID repositories 410(1) and 410(n) can be located on the RFID aware device or an external server as denoted in FIG. 3. For example, ID repositories 410(1) and 410(n) could be located within an EPCglobal® network and stored within a remote server that can be accessed over the Internet or intranet. In this example, ID repositories 410(1) and 410(n) could be accessed by an RFID aware device 300 through a local or an Internet/intranet network access interface 300X. An Internet/intranet network access interface could be a wired connection such as a traditional RJ45 connection or various wireless connections using such standards as WIFI, Bluetooth®, or Zigbee. Alternatively, IDs commonly accessed by interrogators could be stored and accessed in the main memory 300Z of the RFID aware device 300. Moreover, the information in the ID repository can be updated by means of an internal interrogator which could periodically check for the present of product, case/package and pallet/container tags. For example, if a product, e.g., a wine bottle breaks and is removed from the conveyor pallet, the RFID aware device 300 would report this fact to the one or more RFID repositories 400.

Accordingly, as can be seen in FIG. 3, at an interrogation point, an arbitrary interrogator 110 transmits a command specific to that type of interrogator to at least one or more RFID aware devices 300(1) and/or 300(n), which are received by a respective RF transceiver 310. In the present invention, an RFID aware device can push all information contained in one or more ID repositories 410(1) and 410(n) onto any interrogator type (if capable of handling/receiving the information) in a single response signal. Alternatively, the present invention can respond to an interrogator, which would read a predetermined RF signal transmitted from the RFID aware device 300 as known to those skilled in the art.

The received command from the arbitrary interrogator 110 is simultaneously processed by the RFID aware device's controller 320, which first determines the type of interrogator and then based upon that information receives the transmitted command and converts the command into a digital message. Next, the digitized message is forwarded to an RFID emulation logic unit 330, which employs control logic 332 to determine if the command signal is a read or write command. If the interrogator sends a read command, control logic 332 initiates functionality to retrieve an ID from one or more ID repositories 410(1) and 410(n) which contain information contained in each product RFID tag 122, each case/package RFID tag 124 and pallet/container RFID tag 126 in the example workflow scenario as shown in FIG. 1B. More specifically, the control logic 332 retrieves/locates the ID(s) with respect to each RFID tag(s) in the ID repositories 410(1)-410(n) and transmits them to the interrogator 110. An inference engine 334 can be provided to provide context information to control logic 332 for the purpose of determining and selecting the appropriate ID to a specific interrogator 110. For example, at one specific read point, e.g. "read point number 1" in the supply chain network, a user might only be interested in the red wine on pallet 170 while at another read point, e.g. "read point number 2" a user might be interested in the white wine on pallet 170. To simplify the response to the interrogator 110, inference engine 334 will provide that only the IDs with respect to the product RFID tags or case RFID tags for the red wine product are transmitted to the interrogator at read point "number 1" and IDs with respect to the white wine product are transmitted to the interrogator at read point "number 2."

After retrieving the ID from the ID repositories 410 and 410n, the control logic transmits the ID back to the RFID aware device's controller 320, which converts the ID to a response suitable for RF transmission by the RF transceiver 310. The RF transceiver 310 then transmits the response back to the interrogator 110 which can then transmit the ID to an attached database (not shown) for further processing.

If the interrogator sends a write command with a new ID, then the control logic 332 initiates functionality for adding the ID to one or more ID repositories 410(10-410(n). The control logic 332 will emulate writing to the physical RFID tag, e.g. to update the pallet or container device with possible changes in shipping address or other changes in the supply chain network.

In addition, for the present invention, as shown in FIG. 2, an RFID aware device 300 can be equipped with a display screen 340, a keyboard or other input techniques 350 as those known in the art to allow users at any point in the supply chain (not just a read point) to quickly determine information on the products, cases/packages or pallet/container. RFID aware device 300 can further be programmed to provide information to a user in the supply chain with information written to the product RFID tag 122, the case RFID tag 124 and pallet RFID tag 126. In other words, a user in the supply chain can, for example, quickly discern how many products, e.g. bottles of wine of varying types, are on pallet 170 and where they are being shipped. RFID aware device 300 can also optionally be housed in a ridged container 370 with a handle 360 for durability in shipping and warehousing to allow the RFID aware device 300 to be inserted into a pallet 170 as shown in FIG. 3. Additionally, the present invention may contain one or more interrogators as an alternative method of obtaining IDs with respect to each product RFID tag, each case RFID tag and pallet RFID tag.

The present invention provides a method, a system and a computer storage device that emulates RFID tags in various objects, without the need of physically attaching tags to those objects. In addition, the emulated RFID tags provided by the present invention provides the following benefits: 1) lower the possibility of an interrogator misreading or not reading an RFID tag data due to damage to the physical tags; 2) reducing the instances of interference caused by multiple tags send/receiving information to an interrogator as the dialogue between an interrogator and a tag is reduced by the present invention; and 3) alleviates the load of tag data filtering and any other relevant data processing by the interrogator or an edge controller/database connected to the interrogator.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. An apparatus for emulating multiple RFID tag types associated with multiple product types traversing a supply chain/logistics network, said apparatus comprising:

a data storage repository for storing identification data associated with multiple products associated with each of said multiple RFID tag types;

an RFID transceiver for receiving an interrogation signal from an RFID interrogation device located at one or more read points in said supply chain/logistics network, said interrogation signal associated with a specific RFID tag type, a controller unit responsive to said interrogation signal for generating a command signal including one of: a write command for adding an identifying data associated with a product to said identification storage data repository upon the request from said RFID interrogation device, or a read command for retrieving identifying data concerning a product from said identification data repository;

an RFID emulation controller unit, responsive to said one of: read or write command signal for initiating respective retrieval of identification data from said data storage repository, or storage of identification data to said storage repository, said retrieval of identification data including identification data associated with multiple products at said read point having said specific RFID tag type;

said controller unit for generating a single response to a received interrogation signal including said identification data associated with multiple products retrieved from said data storage repository, said single response representing identification information as to said one or more RFID tag types, said controller implementing context information based on a location of said read point for determining said identification data to a specific interrogation provided at said read point; and wherein the RFID emulation unit retrieves or stores said identification data on said data storage repository associated with a server over the Internet, or locally in non-volatile memory of each said apparatus.

2. The apparatus of claim 1, wherein one specific RFID tag type for which said interrogation signal is received corresponds to a product type to be conveyed in said supply chain/logistics network.

3. The apparatus of claim 1, wherein one specific RFID tag type for which said interrogation signal is received corresponds to a container that conveys one or more products throughout said supply chain/logistics network.

4. The apparatus of claim 3, wherein said container includes a pallet.

5. The apparatus of claim 3, wherein one specific RFID tag type for which said interrogation signal is received corresponds to a package device for housing multiple products.

6. The apparatus of claim 5, further comprising an input device for permitting a user access to said data storage repository at any point in the supply chain/logistic network to quickly determine information regarding the product type, container device or package device.

7. The apparatus of claim 3, further comprising:
one or more interrogators for obtaining IDs with respect to each said RFID tag type on a container device and communicating said obtained IDs to said data storage repository for storage.

8. The apparatus of claim 1, further comprising:
a housing for housing the apparatus and facilitate mounting in a pallet or container device for conveyance through said supply chain/logistics network.

* * * * *